United States Patent [19]

Stern et al.

[11] 4,364,279
[45] Dec. 21, 1982

[54] SHEAR BEAM LOAD CELL SYSTEM

[75] Inventors: Harry Stern; Charles Airesman, both of Cumberland, Md.

[73] Assignee: Allegany Technology, Inc., Cumberland, Md.

[21] Appl. No.: 221,560

[22] Filed: Dec. 31, 1980

[51] Int. Cl.³ .............................................. G01L 1/22
[52] U.S. Cl. ..................................... 73/862.66; 338/5
[58] Field of Search ..................... 73/862.66; 177/211; 338/5

[56] References Cited

U.S. PATENT DOCUMENTS 3,161,046 12/1964 Farley ................................ 177/211
3,680,372 8/1972 Ormond ................................ 338/5
3,985,025 10/1976 Ormond ........................... 73/862.66

Primary Examiner—James J. Gill
Attorney, Agent, or Firm—Morton J. Rosenberg

[57] ABSTRACT

A shear beam load cell system (10) for measuring loads applied to a longitudinally extended beam member (12) having a central axis (24) extending in a longitudinal direction (22). Flexure isolation means (26) are formed on opposing longitudinal end sections (28, 30) of the beam member for minimizing strain on a central section (32) of the beam member (12) responsive to load displacements on the beam member (12). A multiplicity of strain gauge members (14, 16, 18, 20) are secured to the central section (32) of the beam member (12). Web flexure means (58) are formed within the central section (32) of the beam member (12) for mounting the strain gauge members (14, 16, 18, 20) to the beam member (12). The shear beam load cell system (10) minimizes stress changes in the central section (32) of the beam member (12) in response to non-measurement loads applied to the beam member (12).

13 Claims, 6 Drawing Figures

SHEAR BEAM LOAD CELL SYSTEM

BACKGROUND OF THE INVENTION

1. Field of the Invention

This invention relates to force measuring systems. In particular, this invention pertains to force measuring systems which provide for an electrical output responsive to an applied force loading. More in particular, this invention relates to a shear beam load cell utilizing shear type strain gauges to measure the force loading. Still further, this invention pertains to a shear beam load cell system which provides for integral flexure isolation mechanisms. Further, this invention relates to a shear beam load cell system which utilizes particular geometries and contours to aid in stability, as well as to maximize the linearity of the electrical output to provide a more accurate force measurement reading.

2. Prior Art

Load cell systems for measuring force applied to the cell are well-known in the art. Some prior art force load cells were constructed devoid of swivels or flexure isolation means. In general, all load cells should be constructed to be as insensitive to off-center force loading as possible, since force errors occur in various weighing processes. In some prior art load cells, the sensitivity to off-center loading was unacceptable, thus requiring the platform to be stabilized in order that such did not shift its position responsive to the force load location.

Such stabilization systems used various contoured bar members, as well as flexured members. These prior art stabilizing systems increased the costs dramatically of the overall weighing systems and due to space requirements, were in many cases found to be non-installable. Additionally, when the above-referenced stabilization systems were used in conjunction with the prior art load cell systems, the apparent sensitivity of each load cell in the same overall weighing system was found to be a dependent parameter on the other load cells. Thus, where one load cell was de-sensitized, other load cells may have been sensitized to off-center loading.

Additionally, high capacity scale calibration is generally cumbersome as well as expensive. In general, multiple load cells are electrically interconnected by paralleling the electrical inputs/outputs to a strain gauge bridge. In such prior art systems, it was necessary to install potentiometers at the input to the load cells in order to match the output sensitivity of each load cell. Since the load cells are in electrically parallel connection, the adjustment of any one load cell potentiometer affects the sensitivity of other load cells in the overall system. The electrical interaction has made it a rather slow process to equalize electrical outputs from each load cell in an overall scale system. By minimizing the sensitivity to off-center loading for the present load cell system, such eliminates the need for prior art stabilizing systems and essentially eliminates the need for potentiometer output equalization.

In some prior art load cell systems, an attempt was made to minimize the sensitivity to off-center loading. Cantilever shear beam systems are known in the art. However, cantilever shear beam load cells have an increased size for a given capacity when taken with respect to the subject shear beam load cell system. Additionally, prior art cantilever beam load cells must be large enough to support mounting bolts or other type fastening mechanisms required to hold the leverage from a cantilever type mounting. Since prior art cantilever type beams require large mounting surfaces, such prior art load cells include large wasted areas which cannot be utilized for the force measuring. In some prior art shear type load cells, such as that shown in U.S. Pat. No. 3,985,025, the webs and overall beams are generally rectangular in contour. Such rectangular or square cross-sectional areas are difficult to mate with other hardware used in the overall system. Thus, such prior art systems are generally machined parallel and mating hardware must rely on extremely close tolerances. Additionally, in such prior art shear measuring load cell systems, the beams are fixed at both ends and in many cases have been found to buckle and form an unwanted undulating configuration. These types of prior art load cell systems thus require increased space installation volumes, increased machining and expended labor costs in order to provide an off-center load desensitization aspect to the overall system.

SUMMARY OF THE INVENTION

Shear beam load cell systems which incorporate a longitudinally extending beam member having a central axis. Flexure isolation means are formed on opposing longitudinal end sections of the beam member for minimizing stress changes in a central section of the beam member responsive to non-measurement loads applied to the beam member. A plurality of strain gauge elements are fixedly secured to the central section of the beam member. Web flexure mechanisms are formed within the central sections of the beam member for mounting the strain gauge members to the beam member.

BRIEF DESCRIPTION OF THE DRAWINGS

FIG. 3 is a sectional view of the shear beam load cell system taken along the Section line 3—3 of FIG. 1;

FIG. 4 is a sectional view of the shear beam load cell system taken along the Section line 4—4 of FIG. 1;

DESCRIPTION OF THE PREFERRED EMBODIMENTS

Referring now to FIGS. 1-6, there is shown shear beam load cell system 10 for measuring and determining force loads applied to beam member 12, as will be detailed in following paragraphs. The overall concept associated with load cell system 10 is utilizable with either a single cantilever beam or dual cantilever beam design. Shear beam load cell system 10 provides for flexure isolation for minimizing stresses incurred during mounting, loading during use, and stress considerations caused by temperature gradients. Flexure isolation is provided for horizontal, vertical and torsional stress considerations.

Figure 2:
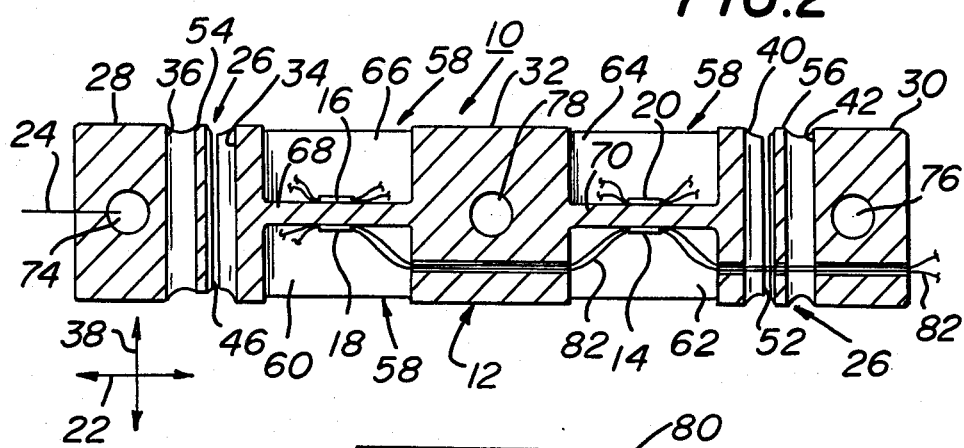
FIG. 2 is a sectional view of the shear beam load cell system taken along the Section line 2—2 of FIG. 1.
Figure 5:
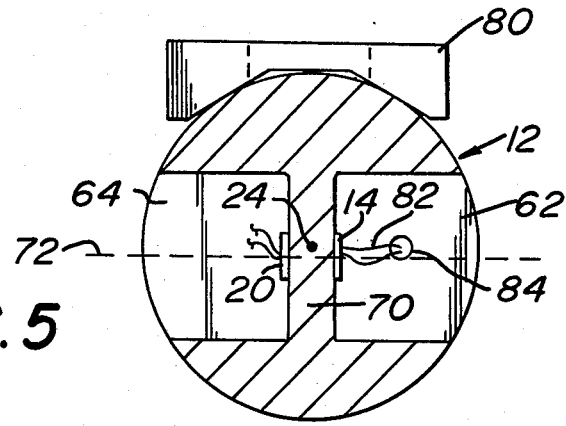
FIG. 5 is a sectional view of the shear beam load cell system taken along the Section line 5—5 of FIG. 1; and, FIG. 6 is a sectional view of the shear beam load cell system taken along the Section line 6—6 of FIG. 1.
Figure 6:
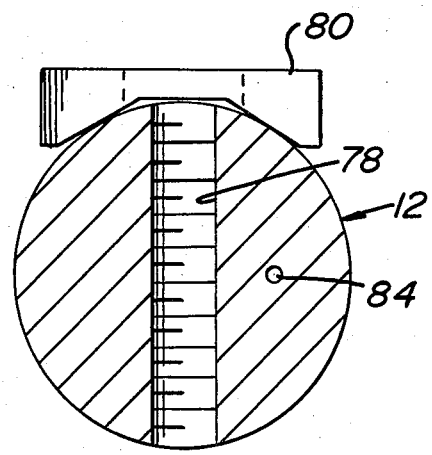

In particular, load cell system 10 uses a plurality of shear strain gauges 14, 16, 18, and 20, as shown in FIGS. 2 and 5. As is the usual case, strain gauges 14–20 sense a strain found in beam member 12 which would ideally vary the electrical resistance in a linear manner such that applied load force to beam 12 may be measured electrically. For reasons to be discussed in following paragraphs, it is seen that shear strain gauges 14 and 16 are tension gauge members and strain gauges 18 and 20, as shown in FIG. 2 are compression strain gauges.

In overall concept, shear beam load cell system 10 is abstractly utilized for measuring force load applied to beam member 12. In specific, such load cell system 10 is useful in the general class of weighing systems which may include crane scales, lift truck scales, floor scales, counting scales, vehicle and tank scales, as well as numerous other types of weighing systems.

Figure 1:
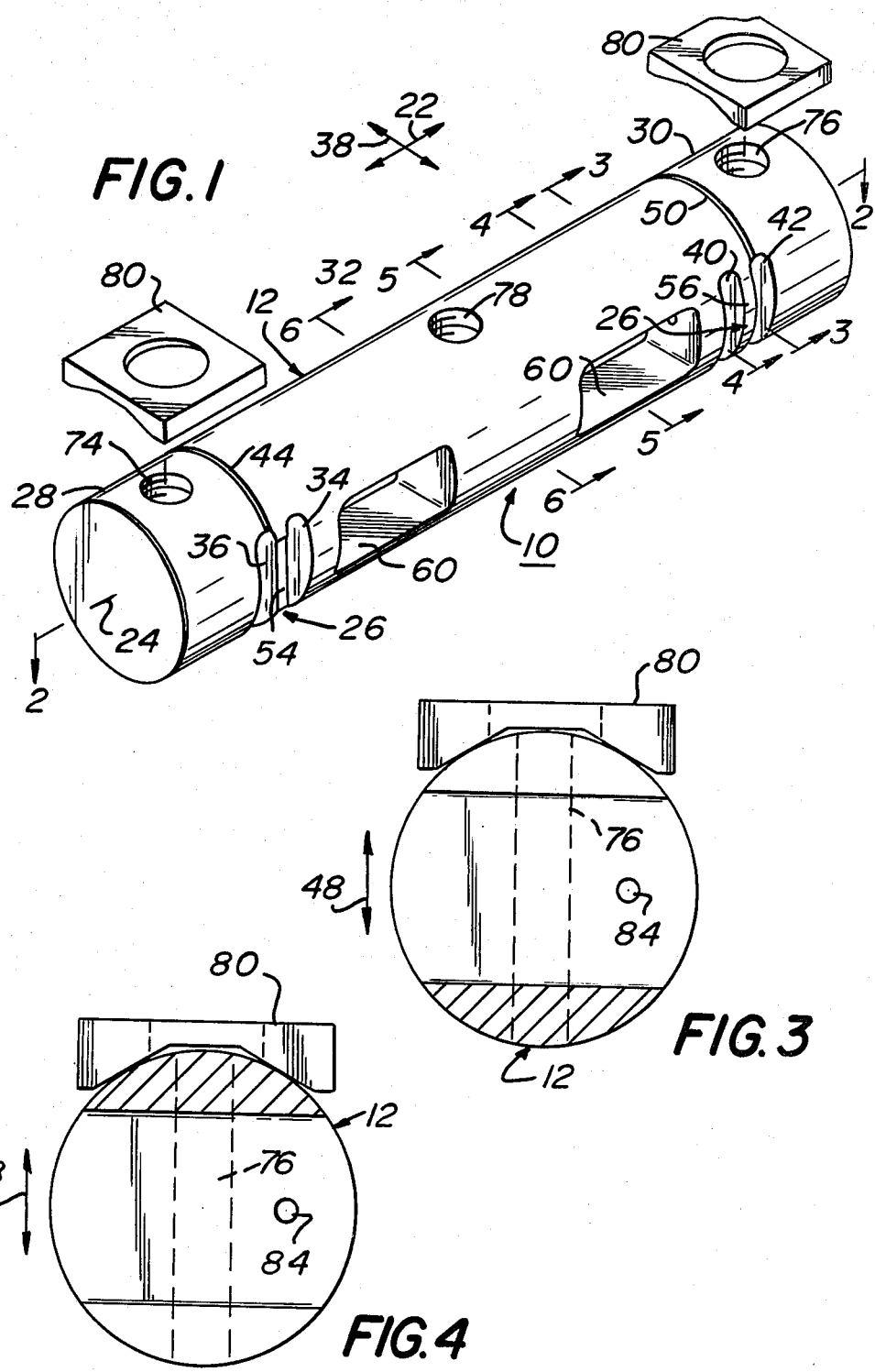
FIG. 1 is a perspective view of the shear beam load cell system.

Shear beam load cell system 10 includes beam member 12 which extends in longitudinal direction 22 shown in FIGS. 1 and 2. Beam member 12 is substantially cylindrical in overall contour and includes central axis line 24. As will be detailed in following paragraphs, beam member 12 includes various section areas having individual overall diameters for purposes and objectives to be described. However, as is seen in FIGS. 3-6, the overall cross-sectional area or contour of beam member 12 is generally circular. Longitudinally extending beam member 12 may be formed of a generally stress elastic type material, such as steel or some like composition which directs itself to the general laws of elastic stress analysis.

Beam member 12 includes end flexure isolation means 26 formed on opposing longitudinal end sections 28 and 30 of beam member 12 for minimizing strain on central section 32 of beam member 12 responsive to various load displacements applied to beam member 12. End flexure isolation means 26 is clearly shown in FIGS. 1 and 2, and includes groove passages 34 and 36 extending in transverse direction 38 through beam end section 28. Additionally, through passages 40 and 42 also pass in transverse direction 38 on beam end section 30.

Slots 44 and 46 extend through beam member 12 in vertical direction 48 and extend from external surfaces of beam member 12 to respective through passages 36 and 34. As is clearly seen in FIGS. 1 and 2, slot section 44 passes from an upper surface of beam 12 and extends in cooperation to through passage 36. As seen in FIG. 2, slot 46 passes and extends from a lower surface of beam member 12 and cooperates in a through opening communication with through passage 34. On opposing end 30, slot 50 passes from an upper surface of beam 12 in cooperative fashion with the passage 42, similarly, slot 52 passing from a lower surface of beam 12 extends through and into through passage 40.

In this manner, transversely directed through passages 34 and 36 in combination with slots 44 and 46, are longitudinally displaced each from the other and define flexure isolation web member 54. Similarly, through passages 40 and 42 in cooperation with slot 50 and 52 define an opposing flexure isolation web member 56. As can be seen in FIGS. 1 and 2, slots 44, 46 and 50, 52 define a longitudinal displacement from the side surfaces thereof. Respective through passages 34, 36 and 42, 40 include a larger longitudinal displacement of the passage cross-sectional area than those of the corresponding slots. Thus, through passages 34, 36 and 40, 42 include a cross-sectional area greater than the cross-sectional area of respective slots cooperating therewith. Such increased area of through passages 40 and 42, as well as 34 and 36 provide for a larger flexure isolation and would be attained by utilization of slot and through passages of equal cross-sectional area. It is noted that the larger cross-sectional area of through passages 34, 36 and 40, 42 allow for the flexure isolation, whereas the decreased longitudinal displacement of the slide surfaces of slots 44, 46 and 50, 52 allow for structural integrity to be maintained. For a 20,000 pound load type capacity beam member 12, the width of through passages 34, 36, 40 and 42 have been used in the range of approximately 1.0 centimeters. Also, the longitudinal displacement of the side surfaces of respective slots has been used in the range of approximately 0.20 centimeters. The generally rectangular through passages 34, 36 and 40, 42 provide for an approximate through passage area in the general range of between 3.0-4.0 centimeters. These dimensions are currently being used in commercial productions of steel beam member 12 having a high capacity. The longitudinal displacement of the side surfaces of the slots as hereinbefore described, may be further displaced in the event that higher load deflections are encountered.

Shear beam load cell system 10 further includes web flexure means 58 formed within central section 32 of beam 12 for mounting strain gauge members 14, 16 and 18, 20 to beam member 12, as is clearly seen in FIGS. 2 and 5. Web flexure means 58 includes a plurality of recesses or wells 60, 62, 64 and 66 formed within central section 32 of beam 12. As can be seen, wells 62 and 64, as well as wells 60 and 66, are aligned in a transverse direction with an opposing well to form the longitudinally extending web member 68 and 70 coincident with central axis extension 24. Web members 68 and 70 thus form elongated beam type sections which may be utilized for mounting of respective strain gauges 14-20.

As can be seen from FIG. 5, wells 62 and 64 as well as wells 60 and 66, include a transversely directed center line 72 which is vertically displaced from beam central axis 24. The vertical displacement between well center line 72 and central beam axis 24 approximates 0.20% of the vertical height dimension of beam member 12. Thus, wells 62, 64, 60 and 66 are essentially closer to the lower surface of beam member 12 than they are to the upper section thereof. The concept of providing a thinner beam section in a lower portion of beam 12 is to substantially allow utilization of the output of both tension and compression. A number of ways in which this could be done have been tried in the past and one of such which has not met with success is to locate the same gauges in a displaced manner from the center line of a particular beam member through trial and error techniques. Further, in such prior systems, there was a great dependency on the operator to locate the gauges accurately within a few thousandths of an inch. This has been found to be extremely difficult. In opposition, by machining the surfaces of wells 62, 64, 60 and 66 in a manner such that the entire well sections were lower, success has been found in aiding in the utilization of the outputs in both tension and compression.

Another factor in providing for the utilization of outputs from the appropriate strain gauge combinations, is to provide strain gauge members 14 and 16 as compression strain gauges and strain gauges 20 and 18 as tension strain gauges. Thus, compression strain gauges 14 and 16 are diagonally opposite and the tension strain gauges similarly mounted within wells 60 and 64 are tension strain gauges which are also diagonally opposing each other in positional location on respective web members 68 and 70. In actual use, one tension gauge such as 20 may see more tension stress whereas the diagonally opposing tension strain gauge 18 may see less stress and each compensates for the other to provide a more accurate output reading.

Strain gauges 14–20 are mounted to respective surfaces of web members 68 and 70 through adhesive bonding techniques. One such technique is by mounting the strain gauge members by a silicone base composition which is commercially available under the Trade Name RTV.

As is seen in FIG. 2, wells 60, 62, 64 and 66 define section areas of central section 32 which includes a second cross-sectional diameter of beam member section 32 which is less than a first cross-sectional diameter of beam end sections 28 and 30. It has been found that by machining down a section of central section 32 in the area of the respective well, that an increase in linearity is achieved. Although the machining down of the diameter in the well section areas of section 32 is generally spherical in operation, it is noted that for the previously described example of load cell system 10, for a 20,000 pound load arrangement, the reduction in diameter approximates 0.025 cms. By this slight machining process, linearity has been found to be up to 0.006 volts per 1.0 volts of excitation.

Referring now to FIGS. 1, 3, 4 and 6, there is shown a pair of threaded openings 74 and 76 passing in vertical direction 48 through opposing end sections 28 and 30 of beam 12. Additionally, central threaded opening 78 passes in a through manner through central section 32 of beam 12. Threaded openings 74, 76 and 78 are utilized for bolting or otherwise securing shear beam load cell system 10 to a particular machine or component system. As may be understood, when bolted to an external system, beam member 12 may be mis-aligned with respect to an impinging vertically directed load.

In order to compensate for any mis-alignment which may occur due to machining tolerances or other extraneous reasons, re-alignment blocks 80 may be provided. As can be seen, re-alignment blocks 80 are vertically alignable with openings 74, 76, or 78 and matingly interface a top surface of beam member 12. Blocks 80 are V-shaped in contour on an undersurface thereof to allow for alignment of any loads impinging on beam member 12. Thus, the circular contour in cross-section of beam member 12 is compensated in an alignment operation through use of re-alignment or V-blocks 80.

Further, shear beam load cell system 10 incorporates longitudinally extending electrical lead openings 84 to allow passage of electrical leads 82 internal to beam member 12. Thus, as can clearly be seen in FIG. 2, electrical leads 82 pass from respective strain gauge members through openings 84 to provide an internal type of electrical lead path for electrical connection to an external electrical system (not part of the concept invention).

Shear beam load cell system 10 is a double shear beam system and when such is deflected perpendicular to longitudinal center line or axis line 24, flexures 26 allow the load to deflect in an unrestricted manner perpendicular to center line or axis 24. This minimizes the stress or deflection on end sections 28 and 30 which would be pulled toward a center of beam member 12. Additionally, the locational placement of strain gauges 14, 16, 18 and 20 are symmetrically displaced each from the other in a longitudinally, as well as a transversely, manner, which allows the strain gauges to work differentially in both horizontal directions, in order to compensate for any off-loading. Off-center loading, as well as side sta-bility is improved by use of re-alignment blocks 80, as has previously been described.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A shear beam load cell system comprising:
   (a) a longitudinally extended beam member having a central axis;
   (b) flexure isolation means formed on opposing longitudinal end sections of said beam member for minimizing stress changes in a central section of said beam member responsive to non-measurement loads applied to said beam member, said flexure isolation means including at least a pair of through passages formed through each of said opposing longitudinal sections of said beam member, said through passages extending in a transverse direction with respect to said beam longitudinal extension and at least a pair of slots passing through said beam member in a substantially vertical direction from an external surface of said beam member to a respective through passage;
   (c) a plurality of strain gauge members fixedly secured to said central section of said beam member; and,
   (d) web flexure means formed within said central section of said beam member for mounting said strain gauge members to said beam member, said web flexure means including a plurality of recesses extending transverse said longitudinal extension from opposing transverse surfaces of said beam member, said recesses defining at least a pair of wells substantially aligned in said transverse direction forming a longitudinally extending web member substantially coincident said central axis, said wells having a transversely directed center line vertically displaced from said beam central axis.

2. The shear beam load cell system as recited in claim 1 where said pair of through passages are longitudinally displaced each from the other defining a flexure isolation web member.

3. The shear beam load cell system as recited in claim 1 where one of said slots extends from an upper surface of said beam member to a respective through passage and said other of said pair of slots extends from a lower surface of said beam member to the other of said through passages.

4. The shear beam load cell system as recited in claim 3 where said pair of through passages has a cross-sectional area greater than a cross-sectional area of said slots.

5. The shear beam load cell system as recited in claim 1 where said strain gauge members are fixedly secured on opposing transverse surfaces of said longitudinally extending web member.

6. The shear beam load cell system as recited in claim 5 where said strain gauge members include:
   (a) at least one tension strain gauge member; and, (b) at least one compression strain gauge member, said tension strain gauge member and said compression strain gauge member being secured to opposing surfaces of said web member.

7. The shear beam load cell system as recited in claim 1 including at least one longitudinally directed electrical lead opening extending through said beam central section and at least one end section for passing therethrough electrical lead wires to said strain gauge members.

8. The shear beam load cell system as recited in claim 7 where said longitudinally extended beam member is substantially cylindrical in contour.

9. The shear beam load cell system as recited in claim 8 where said beam member includes a first cross-sectional diameter of said beam end sections and a second cross-sectional diameter of said beam member section defining said wells formed in said central beam section.

10. The shear beam load system as recited in claim 9 where said longitudinally extended beam member includes at least a pair of vertically directed threaded openings extending through said beam member end sections.

11. The shear beam load system as recited in claim 10 including a vertically directed central threaded opening passing through said central section for engaging a securing bolt member.

12. The shear beam load system as recited in claim 10 including at least one re-alignment block member for matingly engaging an upper surface of said extended beam member, said re-alignment block member being alignable with at least one of said vertically directed threaded openings.

13. The shear beam load system as recited in claim 12 where said re-alignment block member is substantially V-shaped in contour, said V-shaped block member being invertably mounted on an upper surface of said extended beam member.

* * * * *